A. J. HODGES & J. B. MOHLER.
Harvester-Reel Adjustment.
No. 206,788. Patented Aug. 6, 1878.
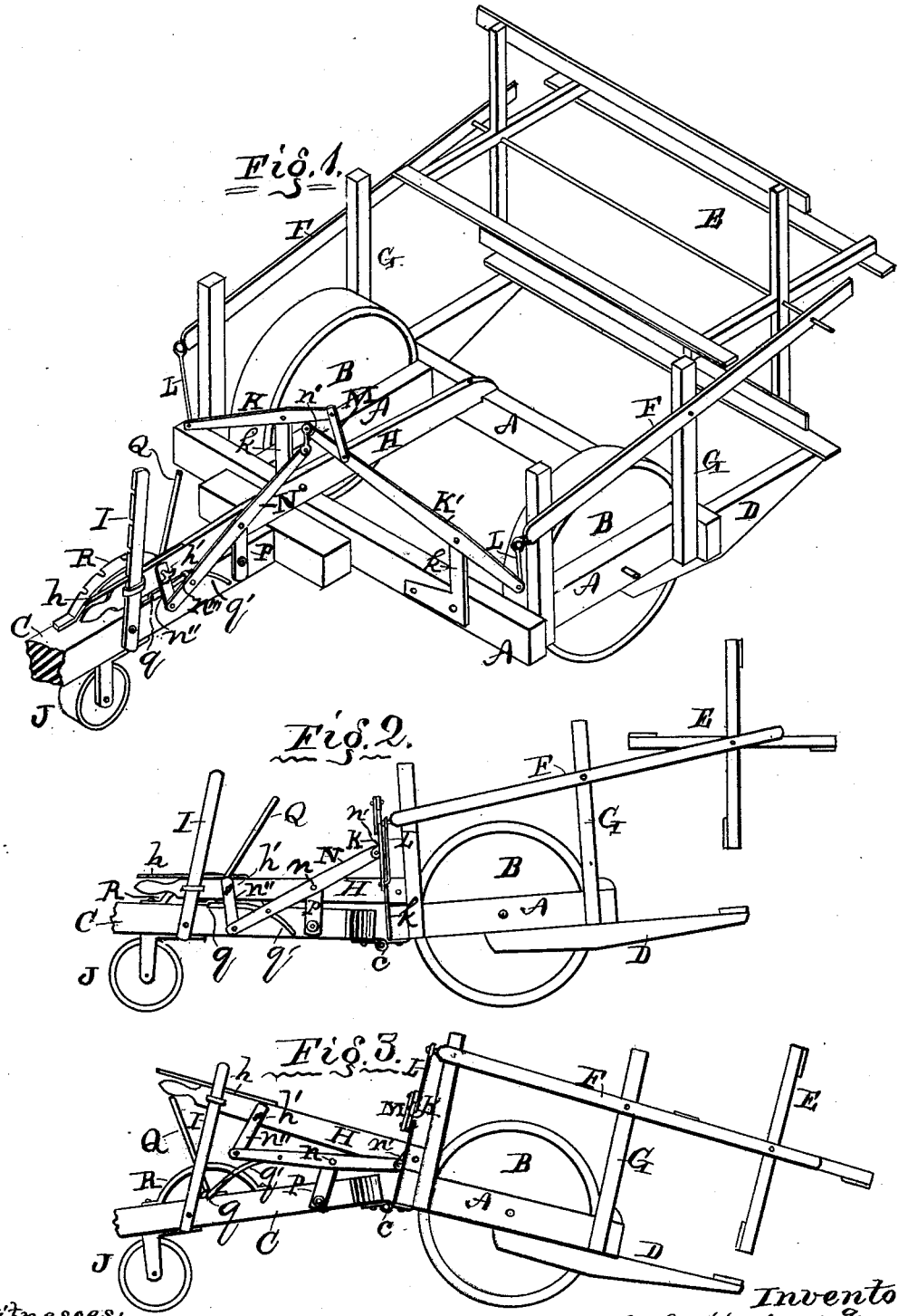
Witnesses:
E. L. Field
P. R. Richard
Inventors:
A. J. Hodges and
J. B. Mohler
By W. B. Richards
Attys

UNITED STATES PATENT OFFICE.

ANDREW J. HODGES, OF PEORIA, AND JAMES B. MOHLER, OF PEKIN, ILLINOIS; SAID MOHLER ASSIGNOR TO SAID HODGES.

IMPROVEMENT IN HARVESTER-REEL ADJUSTMENTS.

Specification forming part of Letters Patent No. 206,788, dated August 6, 1878; application filed November 8, 1877.

*To all whom it may concern:*

Be it known that we, ANDREW J. HODGES, of Peoria, in the county of Peoria and State of Illinois, and JAMES B. MOHLER, of Pekin, Tazewell county, and State of Illinois, have invented certain new and useful Improvements in Harvester-Reel Adjustments; and we do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a perspective view of a machine embodying our invention. Fig. 2 is a side elevation. Fig. 3 is a side elevation, the parts differently adjusted from Fig. 2.

Referring to the parts by letters, A represents the main frame; B, the wheels; C, the thrust-bar, hinged to the main frame at $c$; D, the platform, on the forward end of which the cutter is mounted; E, the reel, journaled in carriers or arms F, which are journaled at their mid-lengths to posts G. H is a lever-handle attached to the main frame A, projecting rearward over the thrust-bar C, and provided with a spring-catch, $h$, by means of which it may be adjusted on a notched bar, I, which projects upward from the bar C, for the purpose of raising and lowering the cutter; and J is a guide-wheel.

The foregoing parts constitute an ordinary grain-heading machine when supplied with cutting apparatus and suitable gearing for operating the reel.

When operating grain-heading machines in low or in lodged grain it is desirable to have the reel adjusted in close proximity to the cutter, and in high or standing grain to have the distance between them increased.

Our invention relates to devices which act automatically in adjusting the distance between the reel and cutter when the main frame is oscillated by the lever H to raise and lower the cutter, all as hereinafter described, and set forth in the claims hereto annexed.

K K′ are levers journaled on standards $k$ to the rear side of the frame A, and their outer ends connected by links L, one to each reel-carrier arm F, and their adjacent ends connected to each other by a link, M, in such manner that oscillating the levers K K′ will oscillate the reel-carriers F, and thereby raise and lower the reel relatively to the cutter-platform D. N is a lever, journaled at $n$ to the upper end of a standard P, which is journaled to the side of the thrust-bar C, for purposes hereinafter described. One end of the lever N is connected, by a link, $n'$, with a projecting end of the lever K′, and the other end is connected, by a link, $n''$, with the lever H, by a removable thumb-screw, $h'$.

Q is a hand-lever, its upper end arranged to engage with a curved rack-bar, R, its central portion, $q$, curved and journaled to the thrust-bar C, and its lower end, $q'$, bent backward and curved slightly downward and passed through an eye, $n'''$, on the lever N.

It will be seen that raising the lever H to raise the rear end of frame A and thrust-bar C at the joint $c$, for the purpose of lowering the forward end of the cutter-platform D, will cause the link $n''$ to act on the lever N, and raising its connected end will depress its other end, and thereby draw downward upon the adjacent ends of the levers K K′, which, in turn, will act on the reel-carrier levers F and lower the reel E to the platform D as it (the platform) descends, as shown at Fig. 3; and as the lever H is depressed to raise the cutter-platform D the reel E will be, by a reverse operation of the levers, raised from the platform D as the platform ascends, as shown at Fig. 2, thus effecting the adjustment of the reel to the platform automatically as the platform is raised and lowered by the lever H to high and low grain. The standard P, being journaled to the bar C, will permit of the lever N moving longitudinally to accommodate itself to the requirements of the foregoing-described operations.

By removing the thumb-screw $h'$ and releasing the link $n''$ the lever N may be oscillated in the evident manner by the hand-lever Q, and the reel raised and lowered relatively to the platform D while the frame A is fixed at any desired adjustment, and while the cutter is running in a higher or lower plane.

What we claim as new is—

1. The lever N, connected to the lever H by link $n''$, and combined with the levers H K K′, reel-carriers F, reel E, frame A, and thrust-bar C, in such manner that raising and lowering the cutter-platform D by the lever H will automatically adjust the reel to the cutter, for the purpose specified.

2. The hand-lever Q, combined with the lever H, link $n''$, lever N, levers K K', reel-carriers F, reel E, and frame A, substantially as and for the purpose specified.

3. The pivoted standard P, in combination with levers N K K', reel-carriers F, reel E, frame A, thrust-bar C, and lever H, substantially as and for the purpose specified.

In testimony that we claim the foregoing as our own we affix our signatures in presence of two witnesses.

ANDREW J. HODGES.
   JAMES B. MOHLER.

Witnesses:
 H. P. WILBER,
 A. B. SAWYER.